United States Patent [19]

Sizemore et al.

[11] Patent Number: 4,924,512
[45] Date of Patent: May 8, 1990

[54] METHOD AND APPARATUS FOR PREVENTING RECOGNITION OF A TELEPHONE DIALING SIGNAL

[75] Inventors: Norman Sizemore, Channahon; Rudolf Gerritsen, Kingston, both of Ill.

[73] Assignee: GSA Systems, Cresthill, Ill.

[21] Appl. No.: 294,731

[22] Filed: Jan. 6, 1989

[51] Int. Cl.⁵ ............................................. H04K 1/02
[52] U.S. Cl. ............................................ 380/6; 380/9; 380/39; 379/200
[58] Field of Search ................ 380/6, 9, 39; 379/200

[56] References Cited

U.S. PATENT DOCUMENTS

| | | | |
|---|---|---|---|
| 3,624,297 | 11/1971 | Chapman | 380/39 |
| 3,681,536 | 8/1972 | Pask et al. | 379/200 |
| 4,000,380 | 12/1976 | Jackson | 379/200 |
| 4,012,602 | 3/1977 | Jackson | 379/200 |
| 4,092,500 | 5/1978 | Hughes | 379/200 |
| 4,099,033 | 7/1978 | Murray | 379/200 |
| 4,297,534 | 10/1981 | Epstein et al. | 379/200 |
| 4,615,575 | 10/1986 | Kossor | 439/304 |
| 4,683,583 | 7/1987 | Kossor | 379/200 |
| 4,771,455 | 9/1988 | Hareyama et al. | 380/6 |

OTHER PUBLICATIONS

The Line-Locker ™ Telephone Line Lock, Mictel, Inc.

*Primary Examiner*—Salvatore Cangialosi
*Attorney, Agent, or Firm*—Bell, Seltzer, Park & Gibson

[57] ABSTRACT

A method and apparatus for preventing recognition by a telephone system of a telephone dialing signal which inverts at least a portion of the telephone dialing signal in response to receiving the telephone dialing signal. Consequently, an inverted dialing signal is produced and is combined with the telephone dialing signal. Voice and data signals are unaffected. The telephone dialing signal is then connected to the telephone system and is unrecognizable as a valid number.

57 Claims, 2 Drawing Sheets

METHOD AND APPARATUS FOR PREVENTING RECOGNITION OF A TELEPHONE DIALING SIGNAL

FIELD OF THE INVENTION

This invention relates generally to telephone call restricting devices, and more particularly relates to preventing recognition by a telephone system of a telephone dialing signal.

BACKGROUND OF THE INVENTION

A problem has been presented with unauthorized telephone calls being made at home or work, particularly because of the high costs associated with the charges for normal long distance telephone calls and with the toll charges for "1-900" telephone calls.

Many attempts have been made to solve this problem. Specifically, there are many mechanical attachments available which position a lock in the fingerholes of a dialer on a rotary telephone, place a cover over a telephone keypad, or disconnect the keypad/dialer altogether. Additionally, U.S. Pat. No. 4,092,500 discloses a mechanical attachment that may be positioned on a rotary dialer and on a touchtone keypad. These attachments mechanically inhibit a telephone call from being made by simply preventing a user from actually pressing a touchtone button or by preventing the rotary dialer from turning properly.

Mechanical devices for preventing telephone calls are not preferred because of their appearance and difficulty of disabling. Particularly, the mechanical devices are not feasible for touchtone telephones since an owner will not want to place a mechanical attachment on the keypad, whether it be covering the whole keypad or just some of the buttons. An owner will not also want to disconnect his keypad altogether since it is difficult to turn the keypad "off" and "on" while still preventing a potential maker of unauthorized calls from doing the same.

Other attempts have been made at preventing telephone calls by electrical devices. For instance, U.S. Pat. No. 3,681,536 discloses a device comprising a series of latches which is operable in response to the first digit dialed. If the first digit dialed is an unauthorized digit, a disabling circuit shorts the telephone lines together so that any further digits dialed from the telephone are prevented from being transmitted to the telephone system. Unfortunately, this device can only block calls beginning with the predetermined unauthorized digit. Additionally, a telephone can have more than one long distance telephone company providing service to it. Therefore, this device will not block all long distance telephone calls because the first digit for long distance service now varies from "0" to "9" with the advent of these large numbers of long distance telephone companies.

U.S. Pat. Nos. 4,000,380 and 4,012,602 teach another type of electrical circuit which prevents an outgoing telephone call. This circuit only works on touchtone telephones by counting the number of dialed digits and, if over a predetermined number, the circuit prevents further touchtone signals from being sent to the telephone system. The disadvantage of this arrangement is that it does not block all telephone calls, but only those over a certain number of digits dialed length (e.g. eight or more for a typical long distance telephone call).

U.S. Pat. No. 4,297,534 discloses an electrical apparatus which disables an outgoing telephone call by filtering the signals on the telephone line. In particular, a passive notch filter, tuned to a specific touchtone frequency, attenuates signals at and around this frequency so that the touchtone signal is difficult to detect. Unfortunately, all the dialed digits cannot be filtered unless a series of passive notch filters is provided, each tuned to one of the various touchtone frequencies. Such a series of notch filters greatly increases the size and cost of the device. Moreover, the notch filter or filters, being passive devices, will attenuate all signals at or near its tuned frequency, whether it be a dialed digit, voice, or data signal. Thus, this device degrades voice and data signals. This nonselectiveness in application is highly undesireable.

German Patent No. DE 3,619,165 A1 discloses a further attempt to inhibit an outgoing telephone call on pulse telephones by an R-C filter circuit. This circuit induces a time delay in the rise of voltage on the telephone line when pulse dialing begins. This delay is sufficiently long to cause this signal to be shorted across the telephone line by a transistor. Such a device will not operate properly with a touchtone telephone.

SUMMARY OF THE INVENTION

With the foregoing in mind, it is the primary object of the present invention to provide an improved device and method for preventing recognition by a telephone system of all outgoing telephone calls.

It is a more specific object of the present invention to provide a device and method which prevents recognition of all the dialed digits in a telephone generated dialing signal.

It is another object of the present invention to provide a device and method which prevents recognition of all dialed telephone digits using a single, simple circuit.

It is yet another object of the present invention to provide a device and method which works with both pulse and touchtone telephones.

It is a further object of the present invention to provide a device and method which does not employ frequency selective filters to attenuate particular frequencies in the audible frequency spectrum.

It is still a further object of the present invention to provide a device and method which allows telephone voice and data signals to pass therethrough without degradation.

These and other objects and advantages of the present invention are achieved by the method and apparatus for preventing recognition of a telephone dialing signal hereinafter more fully described.

The present invention, in its broadest aspect, provides an apparatus for preventing recognition by a telephone system of a telephone dialing signal while allowing processing of voice and data signals. The apparatus comprises a means for distorting signals which exceed a predetermined amplitude while allowing signals which are less than the predetermined amplitude to pass undistorted. This signal distorting means is connected between a telephone and a telephone system. Consequently, a high amplitude telephone dialing signal is distorted to prevent recognition by the telephone system, and low amplitude voice and data signals are not distorted to allow processing by the telephone system.

According to the invention, the signal distorting means may comprise means, which is responsive to the telephone dialing signal, for inverting at least a portion of said telephone dialing signal to produce an inverted dialing signal. The inverted dialing signal and the telephone dialing signal are combined, and a combined signal is provided to the telephone system so that the telephone dialing signal is made unrecognizable to the telephone system.

While the apparatus of the present invention is particularly useful for preventing recognition by a telephone system of a telephone dialing signal, persons skilled in the art will appreciate that the means for inverting the telephone dialing signal may also attenuate this signal. Further, the inverting and attenuating means may also include an enabling means which is responsive to an off-hook signal generated by the telephone system.

A circuit according to the present invention may include a diode and relay serially connected between the telephone and telephone system. The diode allows an "off-hook" signal to pass from the telephone system to the telephone. A bypass capacitor around the diode allows voice and data signals to pass bidirectionally between the telephone and telephone system. The relay is energized by the D.C. off-hook signal to close the contacts thereof. The relay contact may be connected to the emitter of a transistor, the collector of which is connected between the diode and the relay and the base of which is connected to the telephone. In operation, the D.C. "off-hook" signal closes the relay contact and enables the transistor. The transistor is biased off so that low amplitude voice and data signals do not turn on the transistor, so that these signals pass undistorted through the relay and capacitor. High level dialing signals turn the transistor on, for that portion of the signal which exceeds the transistor's turn on voltage, so that an inverted dialing signal appears on the collector and is combined with the dialing signal at the diode/relay junction. The resulting signal is sufficiently distorted to be unrecognizable by a telephone system.

The present invention prevents recognition by a telephone system of a telephone dialing signal according to the following method: A dial tone is sensed, and in response to sensing the dial tone, a telephone dialing signal distorter is activated. The telephone dialing signal is then sensed and in response to sensing the telephone dialing signal, a distorted dialing signal which is unrecognizable to the telephone system is provided. The distorted signal may be provided by inverting at least a portion of the dialing signal, and combining with the dialing signal itself to produce an outgoing dialing signal which is unrecognizable to the telephone system.

It will be understood by those having skill in the art, that according to the invention, a single, simple circuit may block the recognition of every dialed digit. Multiple filters, tuned to each touchtone frequency, are not required. Moreover, the present invention does not employ passive filters which nonselectively filter voice and data as well as the unwanted dialing signals. The amplitude sensitive distorting means of the present invention distorts only the high amplitude telephone dialing signals without degrading voice and data signals. The present invention works with either pulse or touchtone telephones to provide a low cost, reliable, and effective telephone call restricting device.

DESCRIPTION OF THE DRAWINGS

Some of the features and advantages of the invention having been stated, others will appear as the description proceeds, taking in connection with the accompanying drawings, in which.

DETAILED DESCRIPTION OF THE INVENTION

While the present invention will be described hereinafter with particular reference to the accompanying drawings, it is understood at the outset of this description that persons skilled in the applicable arts will be able to modify the specific and arrangements here described and shown while continuing to achieve the desired result of this invention. Accordingly, the description and illustrations are to be taken as broad teaching disclosures directed to persons skilled in the appropriate arts, and not as restricting the scope of the present invention. For example, while the following detailed description discusses and illustrates the present invention in the context with a telephone, it will be readily understood by persons skilled in the art how to use this invention with other types of environments where there are multiple telephones or there are other devices for generating telephone dialing signals, for example a modem. It will also be understood that the invention need not be connected directly to a telephone network, but may be used in connection with a private branch exchange ("PBX"), central office switch, or other telephone switching means.

Figure 1:
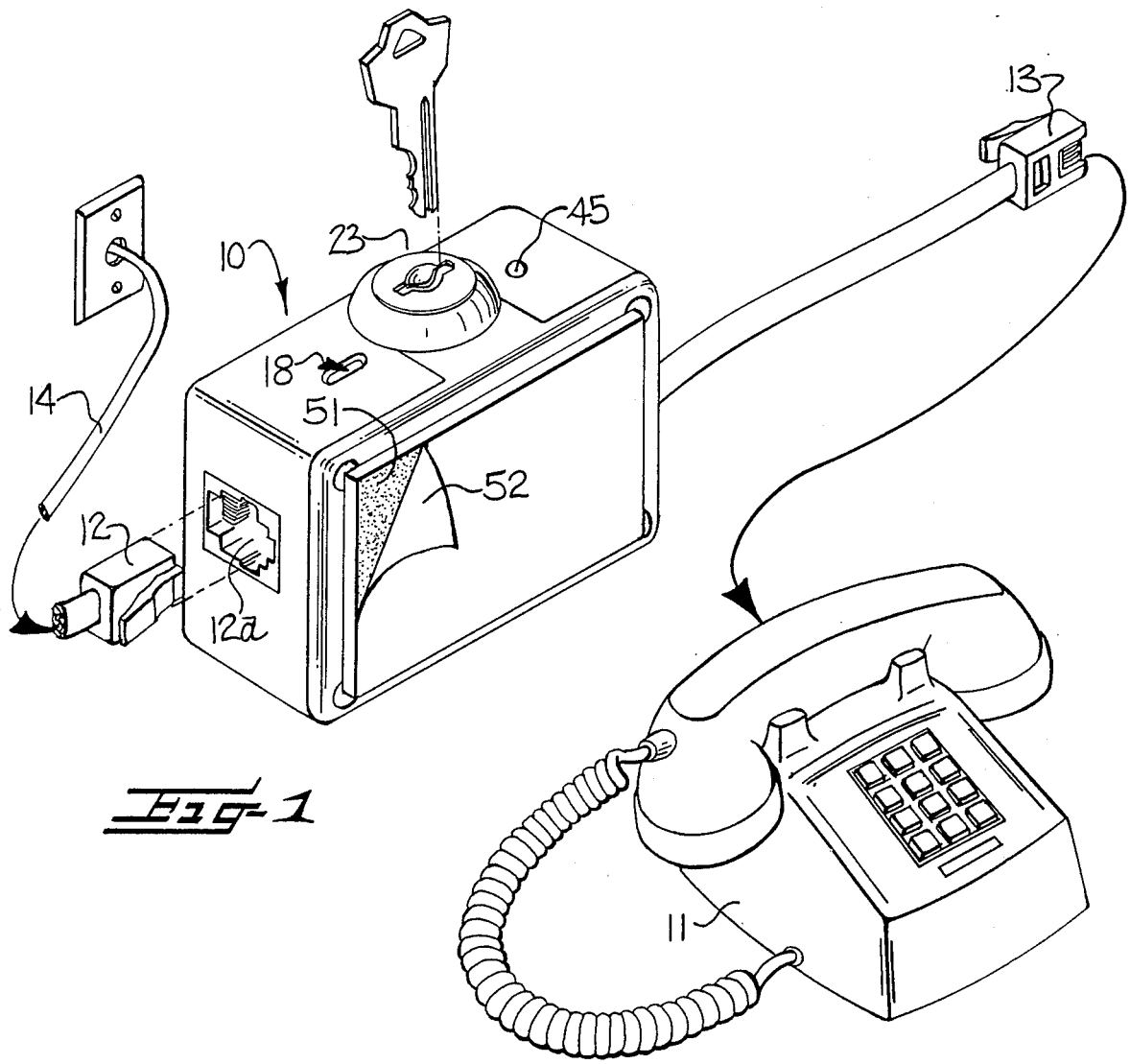
FIG. 1 is a perspective view showing the present invention positioned between a telephone and the telephone line from a telephone system.
Figure 2:
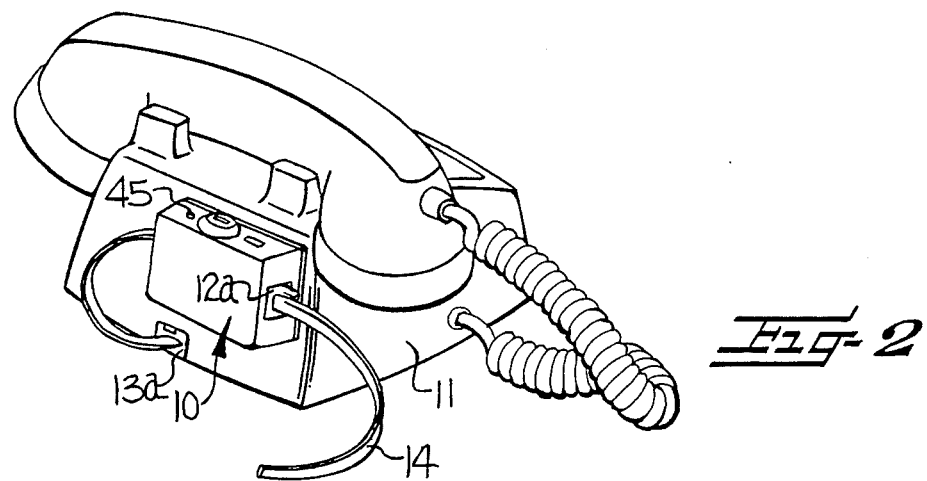
FIG. 2 is a perspective view of the present invention attached to the rear of a telephone.

Referring now to FIG. 1, an outgoing telephone call inhibitor 10, according to the present invention, is connected between the telephone 11 and the telephone line 14. Specifically, a modular connector 12 of the telephone line 14 connects to the receptacle 12a of the inhibitor 10. Likewise, a modular connector 13 of the inhibitor 10 is connected to the receptacle 13a of the telephone 11, as shown in FIG. 2. To prevent a person from simply disconnecting the inhibitor 10, the clips of the modular connectors 12 and 13 are broken off or are otherwise not present. In the preferred embodiment, the inhibitor 10 is attached to the telephone 11 by peeling a layer of material 52 off the adhesive pad 51. The pad 51 is then pressed against the telephone 11. Other suitable attachment means are available for the inhibitor 10.

Without the inhibitor 10 connected between the telephone 11 and the telephone line 14, a problem is presented with unauthorized telephone calls being made at home or work. Consequently, there are high costs associated with such a connection because of the charges for normal long distance calls and for the toll charges for the "1-900" telephone calls.

With the inhibitor 10 connected between the telephone 11 and the telephone line 14, an improved electrical apparatus is provided for preventing recognition by a telephone system of all outgoing calls. As a result, a single, simple circuit may block the recognition of every dialed digit. Multiple filters, tuned to each touchtone frequency, are not required. Moreover, the present invention does not employ passive filters which nonselectively filter voice and data as well as the unwanted dialing signals. The amplitude sensitive distorting means of the present invention distorts only the high amplitude telephone dialing signals without degrading voice and data signals. The present invention works with either pulse or touchtone telephones to provide a low cost, reliable, and effective telephone call restricting device.

Figure 3:
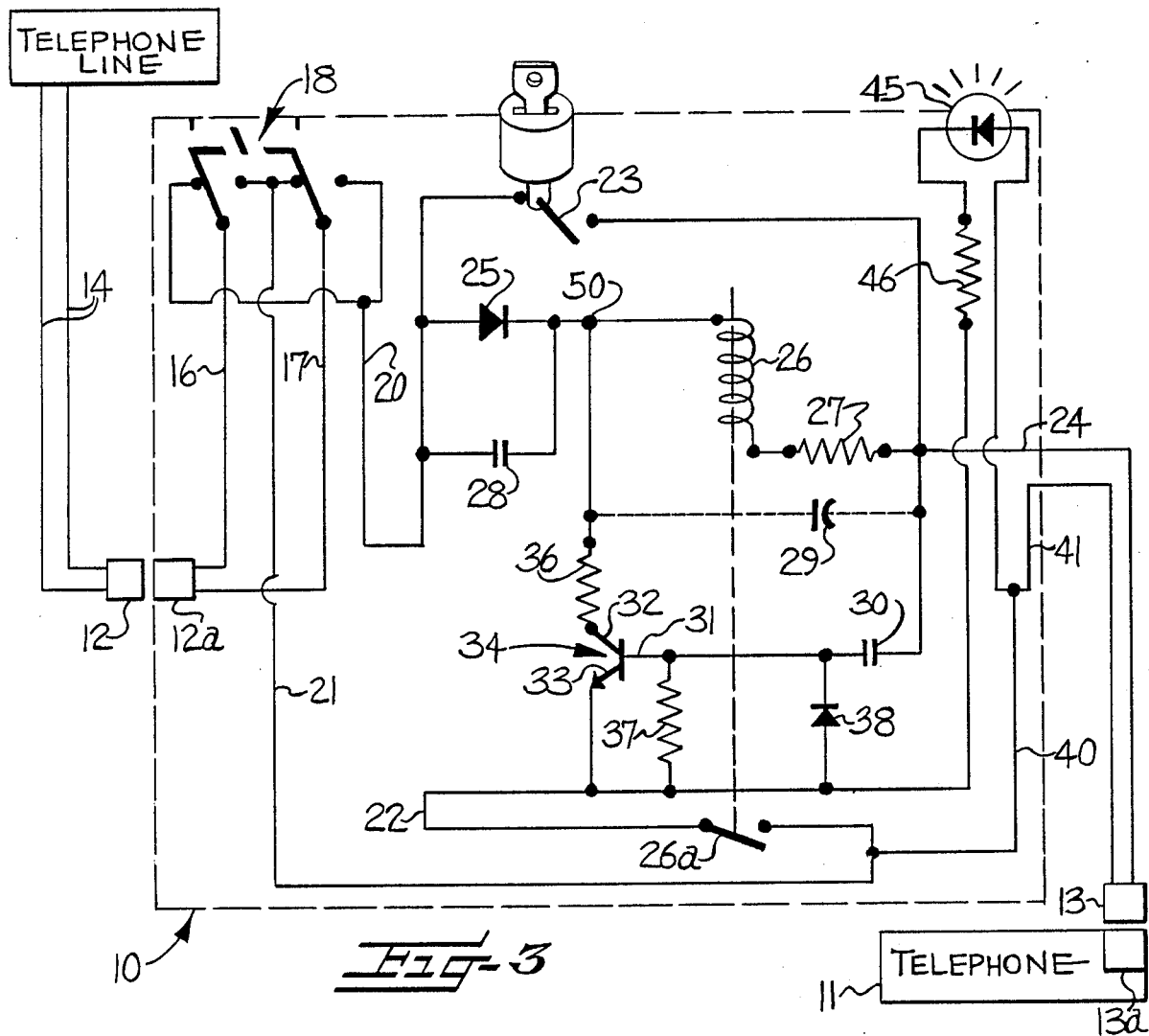
FIG. 3 is a schematic circuit diagram in accordance with the present invention.

Referring now more particularly to FIG. 3, the inhibitor 10 is connected to the telephone line 14 so that the "tip" line 16 (the transmission wire) and the "ring" line 17 (the ground wire) are electrically connected to the polarity reversing switch 18. The line 20 leaving one pole of switch 18 is connected to the keyed switch 23 and then to line 24 which is connected to telephone 11. Diode 25, line sense relay coil 26, and resistor 27 are electrically connected and in parallel with the keyed switch 23. Bypass capacitor 28 is connected in parallel with diode 25. Optional capacitor 29 is connected in parallel with coil 26 and resistor 27 for pulse or rotary type telephones. Capacitor 30, a base lead 31 and a collector lead 32 of transistor 34, and resistor 36 are also connected in parallel with coil 26 and resistor 27. An emitter lead 33 of the transistor 34 is connected to line 22. Biasing resistor 37 is connected in parallel with the emitter lead 33. Limiting diode 38 is connected in parallel with the resistor 37. The contact 26a of the line sense relay coil 26 is connected between the line 22 and a line 21 which is connected to the other pole of switch 18. Line 40 is connected to line 21 and then to line 41 for input to the telephone 11. Light emitting diode ("LED") 45 and resistor 46 are respectively connected in a series from line 40 to line 22. It will be understood by those having skill in the art that a complementary type bipolar transistor or a field effect transistor or other active device may be employed in place of transistor 34.

In operation, the keyed switch 23 must be open in order for the inhibitor 10 to be "in use." However, when the switch 23 closes, the inhibitor 10 indicates if the tip and ring lines 16 and 17 are reversed from the normal position (that is, opposite to that shown by the connection of lines 16 and 17 to lines 20 and 21 in FIG. 3) to an opposite polarity position. A small amount of current flows from the tip line 16 to lines 21 and 40 and effectively energizes the LED 45 so that it is illuminated. This current continues to flow across resistor 46, through the diode 38 to the base lead 31. This forward biases the transistor 34 so that the current flow is from the base lead 31 to the collector lead 32. The current then travels across resistor 36, coil 26, resistor 27, and switch 23 (closed) to line 20, which is connected to the ring line 17.

When a user recognizes the lighted LED, the user must reverse the polarity of the inhibitor 10 (by moving the poles of switch 18 to the opposite position as actually shown in FIG. 3) so that it can be in the normal operation mode. Referring to FIG. 1, switch 18 is preferably recessed within the housing of inhibitor 10 so that it cannot be inadvertently set.

Referring again to FIG. 3, an alternating (A.C.) ringing signal generator on the tip line 16 causes the telephone 11 to ring. If the switch 23 is closed (i.e. inhibitor 10 not in use), the A.C. ringing generator flows on line 20, across switch 23, and on line 24 to telephone set 11 for bypassing or making transparent the other components of the circuit. This is the same kind of electrical telephone connection that is typically used for incoming and outgoing calls. On the other hand, if the switch 23 is open (i.e. inhibitor 10 in use), the A.C. ring signal generator on tip line 16 flows on line 20 and crosses the capacitor 28, flows through coil 26, flows across resistor 27 and onto line 24 to activate the bell or electronic ringer in the telephone 11.

Upon the telephone set 11 going off-hook by either answering a call or trying to establish a call, it causes the telephone system to place direct current (D.C.) on the tip line 16. This direct current flows from the tip line 16 to line 20 and across diode 25, coil 26, resistor 27, and on line 24 to the telephone 11. With the coil 26 being energized by the direct current, its corresponding contact 26a closes so that a circuit path for emitter 33 to ground is completed, thereby enabling transistor 34. It will be understood by those skilled in the art that other electromagnetic or electronic switching devices are available for use. For example, a solenoid, relay, or switching transistor may be substituted for coil 26.

If answering a call on telephone 11, normal voice (A.C.) and data communications travel on line 24 across resistor 27, coil 26, and capacitor 28 to line 20 and tip line 16. With voice and data signals having small voltages (i.e. a small amplitude), the transistor 34 does not conduct. Thus, a normal telephone connection is had for an incoming call.

However, if trying to establish a call on telephone 11, when a touchtone button is pressed, an audio tone (which is an A.C. signal with a much higher voltage or amplitude) is placed on line 24 and the components of this active network begin to operate differently because of this new condition. This tone first electrically propogates across resistor 27 and coil 26. This same tone also electrically propogates across capacitor 30 to the transistor 34. The positive portion of the tone above the "turn" on voltage for the transistor 34 causes the transistor to conduct so that this portion of the tone is inverted at the collector lead 32. The A.C. signal which is representative of this inverted portion of the tone then flows from the collector lead 32 and across resistor 36 to junction 50. The resistor attenuates the inverted signal before it reaches junction 50. The inverted and attenuated tone is combined to the A.C. signal previously mentioned coming from the coil 26 at point 50.

With the transistor 34 inverting the positive portion of the touchtone and the resistor attenuating the inverted signal therefrom, the combined electrical signal at point 50 is not similar to the originally generated tone. Thus, the signal at point 50 is so distorted that a telephone switch in a telephone system cannot recognize it as a valid number to thereby allow further processing of a telephone call. This distorting occurs to all of the dialed digits comprising the telephone dialing signal. In summary, when in use, the inhibitor 10 allows a call to be received, but it will not allow an outgoing call to be established.

It should also be noted that the present invention may be employed with pulse or rotary dial telephone sets by simply inserting capacitor 29 and parallel with coil 26 and resistor 27. This is because a pulse telephone signal may be viewed as a burst of A.C. signals as far as the circuit operation is concerned. Capacitor 29 smooths the circuit response to a pulse signal. This prevents the contact 26a and transistor 34 from unnecessarily oscillating on and off. Otherwise, the circuit operates as was previously described for the touchtone signal.

It will be understood by those having skill in the art that diode 38 also prevents damage to the components of the circuit in the event of a large voltage or current spike. Resistor 37 is a biasing resistor for the transistor 34. Resistor 46 provides a current limit for the LED 45. Resistor 27 is for generating a voltage drop between line 24 and point 50. Diode 25 is for preventing the current from the reverse polarity indicator from flowing at this point, while allowing the D.C. off-hook signal from the telephone system to flow at this point. Capacitor 30 is for blocking the D.C. off-hook signal from turning on the transistor 34.

Figure 4:
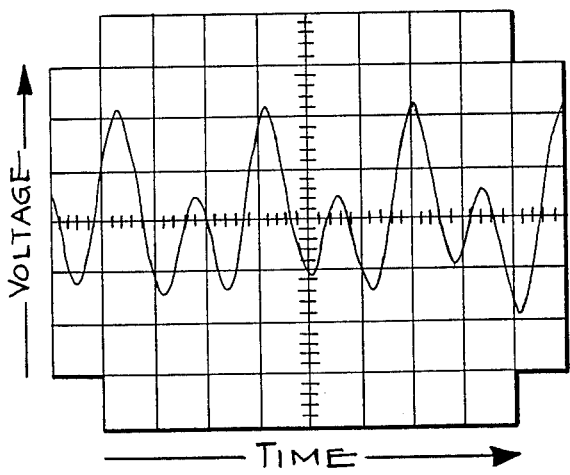
FIG. 4 is a voltage vs. time graph of the telephone dialing signal for the touchtone button "3"
Figure 5:
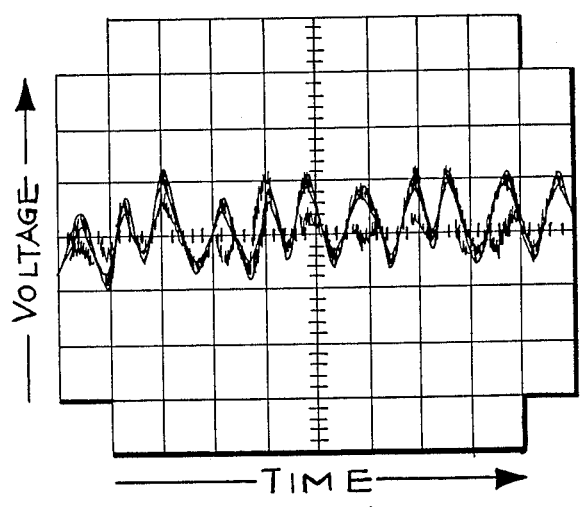
FIG. 5 is a voltage vs. time graph of the telephone dialing signal for the touchtone button "3" as it is made unrecognizable to the telephone system in accordance with the present invention.

Referring now to FIG. 4, there is illustrated a voltage vs. time graph, as would be shown on oscilloscope, for the telephone dialing signal for touchtone button "3" from the telephone 11. In comparison, FIG. 5 shows the voltage vs. time graph for the outgoing dialing signal after the signal for the touchtone button "3" has been processed by the invention. A signal such as this would be unrecognizable to a telephone system as a valid number.

For the purposes of generating the graphs in FIGS. 4 and 5, the following types of components were selected:

switch 18 - DPDT slide switch
switch 23 - DPST key switch (Oak series 500)
coil 26 - line sense relay Teltone M-949-01
diodes 25 and 38 - 1N4002
transistor 34 - 2N4400
resistor 36 - 1KΩ
resistor 37 - 10kΩ
resistor 46 - 15kΩ
resistor 27 - 150Ω
capacitor 28 - 1 μf
capacitor 30 - 0.2 μf
capacitor 29 - 12 μF To one skilled in the art, it is known that the line with the collector 32 and resistor 36 can be connected between the coil 26 and resistor 27. Additionally, there are other ways of inverting that may operate with the invention, and different portions of the telephone dialing signal from those described may be inverted. Similarly, there are other alternatives for attenuating and combining, such as by logic circuit arrangements. Therefore, in the drawings and specification, there have been set forth preferred embodiments of the invention, and although specific terms are employed, they are used in a generic and descriptive sense only and not for purposes of limitation, the scope of the invention being set forth in the following claims:

That which is claimed is:

1. Apparatus for preventing recognition by a telephone system of a telephone dialing signal while allowing processing of voice and data signals, comprising:
   means for distorting signals which exceed a predetermined amplitude while allowing signals which are less than said predetermined amplitude to pass undistorted; and
   means for connecting the signal distorting means between a telephone and a telephone system;
   whereby a high amplitude telephone dialing signal is distorted to prevent recognition by said telephone system, and low amplitude voice and data signals are not distorted to allow processing by said telephone system.

2. The apparatus of claim 1 wherein said means for distorting signals comprises means for inverting at least a portion of said telephone dialing signal to produce an inverted signal, and means for combining the inverted signal with said telephone dialing signal to produce a distorted dialing signal.

3. The apparatus of claim 2 wherein said means for inverting further comprises means for attenuating said at least a portion of said telephone dialing signal.

4. The apparatus of claim 2 wherein said at least a portion of said telephone dialing signal comprises that portion of said telephone dialing signal which exceeds said predetermined amplitude.

5. The apparatus of claim 2 wherein said inverting means comprises a transistor having a controlling electrode and controlled electrodes, said controlling electrode being responsive to said telephone dialing signal for inverting said at least a portion of said telephone dialing signal on at least one of said controlled electrodes.

6. The apparatus of claim 1 wherein said telephone dialing signal comprises a series of touchtone signals.

7. The apparatus of claim 1 wherein said telephone dialing signal comprises a series of pulse signals.

8. The apparatus of claim 1 further comprising means, responsive to an off-hook signal generated by the telephone system, for enabling said means for distorting signals.

9. The apparatus of claim 2 further comprising means responsive to an off-hook signal generated by the telephone system for enabling said inverting means.

10. The apparatus of claim 8 wherein said enabling means comprises a relay.

11. The apparatus of claim 8 wherein said enabling means comprises a line sense relay.

12. The apparatus of claim 2 wherein said inverting means is unresponsive to said voice and data signals.

13. The apparatus of claim 2 wherein said inverting means comprises an active electronic device.

14. The apparatus of claim 1 further comprising means for indicating improper connection to the telephone system.

15. The apparatus of claim 14 wherein said means for indicating improper connection comprises means for indicating reverse polarity connection.

16. The apparatus of claim 1 further comprising means for reversing the polarity of said connecting means.

17. The apparatus of claim 1 further comprising means for directly connecting said telephone to the telephone system.

18. The apparatus of claim 17 wherein said means for directly connecting comprises a keyed switch.

19. Apparatus for preventing recognition by a telephone system of a telephone dialing signal, comprising:
   means, responsive to said telephone dialing signal, for inverting at least a portion of said telephone dialing signal to produce an inverted dialing signal; and
   means for combining said inverted dialing signal and said telephone dialing signal, said combining means being adapted for connection to the telephone system;
   whereby said telephone dialing signal is unrecognizable to the telephone system.

20. The apparatus of claim 19 wherein said inverting means comprises means for inverting and attenuating said at least a portion of said telephone dialing signal to produce said inverted dialing signal.

21. The apparatus of claim 19 wherein said inverting means comprises a transistor having a controlling electrode and controlled electrodes, said controlling electrode being responsive to said telephone dialing signal for inverting said at least a portion of said telephone dialing signal on at least one of said controlled electrodes.

22. The apparatus of claim 19 wherein said telephone dialing signal comprises a series of touchtone signals.

23. The apparatus of claim 19 wherein said telephone dialing signal comprises a series of pulse signals.

24. The apparatus of claim 19 further comprising means responsive to an off-hook signal generated by the telephone system, for enabling said inverting means.

25. The apparatus of claim 24 wherein said enabling means comprises a relay.

26. The apparatus of claim 24 wherein said enabling means comprises a line sense relay.

27. The apparatus of claim 19 wherein said inverting means is unresponsive to voice and data signals.

28. The apparatus of claim 19 wherein said inverting means comprises an active electronic device.

29. The apparatus of claim 19 further comprising means for indicating improper connection to the telephone system.

30. The apparatus of claim 29 wherein said means for indicating improper connection comprises means for indicating reverse polarity connection.

31. The apparatus of claim 19 further comprising means for reversing the polarity of the connection of said combining means to the telephone system.

32. The apparatus of claim 19 further comprising means for directly connecting said telephone to the telephone system.

33. The apparatus of claim 32 wherein said means for directly connecting comprises a keyed switch.

34. Apparatus for preventing recognition by a telephone system of a telephone dialing signal, comprising:
means, responsive to said telephone dialing signal, for inverting and attenuating at least a portion of said telephone dialing signal to produce an amplitude distorted dialing signal; said inverting and attenuating means including an enabling means responsive to an off-hook signal generated by the telephone system for enabling said inverting and attenuating means; said inverting and attenuating means including an active electronic device; and
means for combining said amplitude distorted dialing signal and said telephone dialing signal, said combining means being adapted for connection to said telephone system;
whereby said telephone dialing signal is made unrecognizable to the telephone system.

35. The apparatus of claim 34 wherein said inverting and attenuating means comprises a transistor, having a controlling electrode and controlled electrodes, and at least one resistor connected to at least one of said controlled electrodes; said controlling electrode being responsive to said telephone dialing signal for inverting said at least a portion of said telephone dialing signal on at least one of said controlled electrodes; the inverted signal being attenuated by said resistor to thereby produce said amplitude distorted dialing signal.

36. The apparatus of claim 34 wherein said enabling means comprises a relay.

37. The apparatus of claim 34 wherein said at least a portion of said telephone dialing signal is a high amplitude portion of said telephone dialing signal; and wherein said inverting and attenuating means is unresponsive to low amplitude telephone voice and data signals, whereby said telephone dialing signal is amplitude distorted to prevent recognition by the telephone system, while the voice and data signals are processed undistorted.

38. Apparatus for preventing recognition by a telephone system of a telephone dialing signal while allowing recognition by said telephone system of voice and data signals and allowing recognition by said telephone of ring, off-hook, voice, and data signals, comprising:
first means adapted for connection to a telephone;
second means adapted for connection to a telephone system;
third means connected between said first and second means for allowing said voice and data signals to pass between said first and second means and allowing said ring signal to pass from said second to said first means; said third means including relay means responsive to said off-hook signal for closing the contact thereof; and
a transistor connected between said first and second means and said relay contact; said transistor being enabled by said relay contact and being responsive to said dialing signal for inverting that portion of said dialing signal which exceeds a predetermined amplitude to produce an inverted signal, and applying the inverted signal to said second means, whereby the inverted signal at said second means prevents said dialing signal from being recognized by said telephone system.

39. The apparatus of claim 38 wherein said transistor includes a controlling electrode and a pair of controlled electrodes; said controlling electrode being connected to said first means, one of said controlled electrodes being connected to said second means, and the other of said controlled electrodes being connected to said relay contact.

40. The apparatus of claim 38 further comprising means for directly connecting said first means to said second means.

41. The apparatus of claim 40 wherein said means for directly connecting comprises a keyed switch.

42. The apparatus of claim 39 further comprising means for indicating improper connection to said telephone system.

43. The apparatus of claim 42 wherein said means for indicating improper connection comprises means for indicating reverse polarity connection.

44. The apparatus of claim 39 further comprising switch means for reversing the polarity of said second means.

45. The apparatus of claim 39 further comprising a resistor between said one of said controlled electrodes and said second means for attenuating the inverted signal.

46. Apparatus for preventing recognition by a telephone system of a telephone dialing signal while allowing recognition by said telephone system of voice and data signals and allowing recognition by said telephone of ring, off-hook, voice, and data signals, comprising:
first means adapted for connection to a telephone;
second means adapted for connection to a telephone system;
a diode and relay serially connected between said first and second means, said diode being bypassed by a capacitor, said diode allowing said off-hook signal to pass from said second to said first means, said capacitor allowing said voice, data, and ring signals to pass between said first and second means; said relay being responsive to said off-hook signal for closing the contact thereof; and a transistor having a controlling electrode and a pair of controlled electrodes, said controlling electrode being connected to said first means, one of said controlled electrodes being connected between said diode and relay, the other of said controlled electrodes being connected to said relay contact; said transistor being enabled by closing said relay contact; said controlled electrodes becoming conductive in response to a first portion of said dialing signal to thereby distort the signal between said diode and said relay, said controlled electrodes becoming nonconductive in response to said voice and data signals to thereby allow said voice and data signals to pass undistorted through said diode and relay.

47. The apparatus of claim 46 wherein said transistor is a bipolar transistor, the base of which is connected to said first means, the emitter of which is connected to said relay contact, and the collector of which is connected between said diode and said relay.

48. The apparatus of claim 47 further comprising a resistor, one end of which is connected to said collector, and the other end of which is connected between said diode and said relay.

49. The apparatus of claim 46 further comprising a keyed switch for bypassing said diode and relay.

50. A method for preventing recognition by a telephone system of a telephone dialing signal, comprising the steps of:

establishing a telephone connection having a dial tone;

transmitting from a telephone device a telephone dialing signal;

in response to said telephone dialing signal, inverting at least a portion of said telephone dialing signal to produce an inverted dialing signal; and combining said inverted dialing signal and said telephone dialing signal to produce an outgoing dialing signal;

whereby said outgoing dialing signal is unrecognizable to the telephone system.

51. The method of claim 50 wherein said step of inverting further comprises inverting and attenuating said at least a portion of said telephone dialing signal to produce said inverted dialing signal.

52. The method of claim 50 wherein said inverting step is preceded by the step of enabling a monitor for said telephone dialing signal.

53. The method of claim 51 wherein said inverting and attenuating step is preceded by the step of enabling a monitor for said telephone dialing signal.

54. The method of claim 50 wherein said step of inverting is unresponsive to telephone voice and data signals.

55. The method of claim 50 wherein said inverting step comprises the step of inverting only that portion of said telephone dialing signal which exceeds a predetermined amplitude.

56. A method for preventing recognition by a telephone system of a telephone dialing signal, said method comprising:

sensing a dial tone;

activating a telephone dialing signal distorter in response to a sensed dial tone;

sensing a telephone dialing signal; and providing a distorted dialing signal in response to a sensed telephone dialing signal;

whereby said distorted dialing signal is unrecognizable to the telephone system.

57. The method of claim 56 wherein said step of providing a distorted dialing signal comprises the step of inverting at least a portion of said telephone dialing signal to produce an inverted dialing signal and combining said inverted dialing signal and said telephone dialing signal to produce said distorted dialing signal.

* * * * *